(12) United States Patent
Setoguchi

(10) Patent No.: US 6,400,365 B1
(45) Date of Patent: Jun. 4, 2002

(54) DISPLAY METHOD OF THREE-DIMENSIONAL SHAPE

(76) Inventor: Ryozo Setoguchi, 27-3, Naritahgashi 3-chome, Suginami-ku, Tokyo (JP)

( * ) Notice: Subject to any disclaimer, the term of this patent is extended or adjusted under 35 U.S.C. 154(b) by 0 days.

(21) Appl. No.: 09/319,671

(22) PCT Filed: Dec. 5, 1996

(86) PCT No.: PCT/JP96/03564

§ 371 (c)(1),
(2), (4) Date: Jun. 17, 1999

(87) PCT Pub. No.: WO98/25233

PCT Pub. Date: Jun. 11, 1998

(51) Int. Cl.$^7$ ................................ G06T 17/00
(52) U.S. Cl. .................................... 345/427
(58) Field of Search ................ 345/418, 419, 345/425, 426, 427

(56) References Cited

U.S. PATENT DOCUMENTS 5,142,617 A    8/1992   Dalrymple et al.
5,163,126 A   11/1992   Einkauf et al.

FOREIGN PATENT DOCUMENTS

| JP | 2-171877 A | 7/1990 |
| JP | 4-229387 A | 8/1992 |
| JP | 6-36040 A | 2/1994 |
| JP | 6-150016 A | 5/1994 |
| WO | WO 86/07646 A | 12/1986 |

Primary Examiner—Cliff N. Vo
(74) Attorney, Agent, or Firm—Koda & Androlia

(57) ABSTRACT

A presentation method of a three dimensional (3D) shape comprising: a view point and a display screen setting step including setting a view point and a display screen in space; a direction of sight, that is a view direction, setting step including setting a view line, that is a line-of-sight, from the view point; a target shape composing point detecting step including detecting a shape composing point near the set view line; an image of the target shape on a display screen constructing step including constructing an image of the target shape as a point of display screen as projecting points of the target shape.

7 Claims, 10 Drawing Sheets

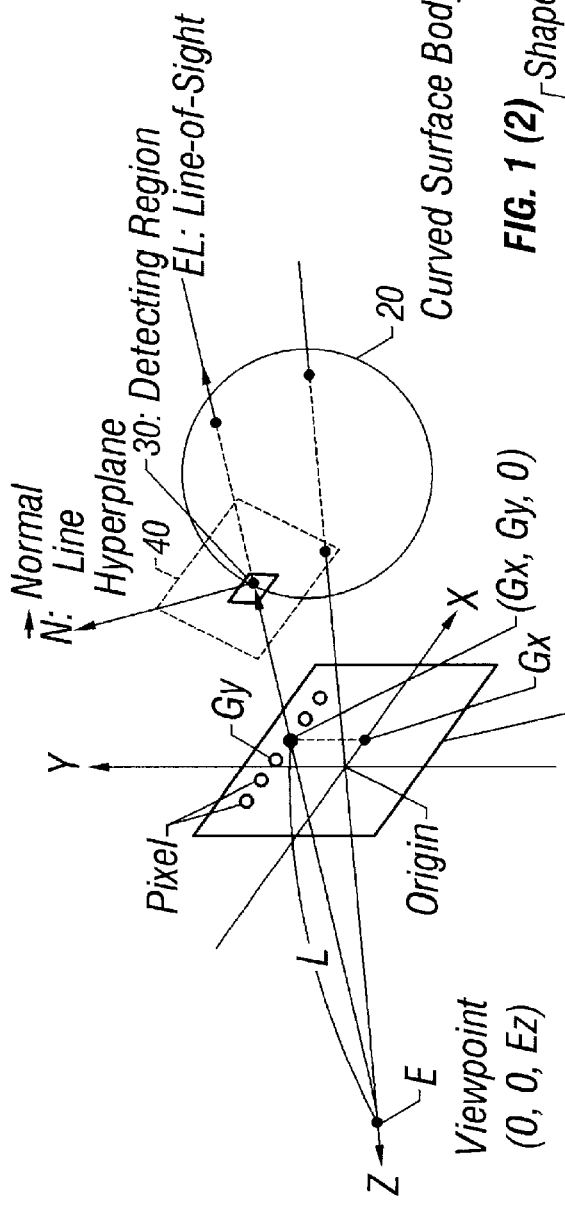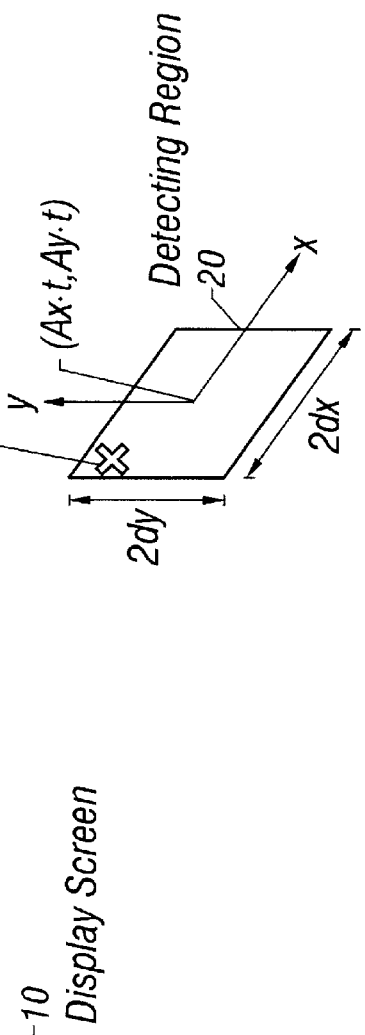
FIG. 1 (1) Principle of Hyper View / Hyper Ray Tracing Method (Mechanism of Screen Control)
FIG. 1 (2) Shape Composing Points (Px, Py)

Principle of Hyper View / Hyper Ray Tracing Method (Mechanism of Ray Tracing)

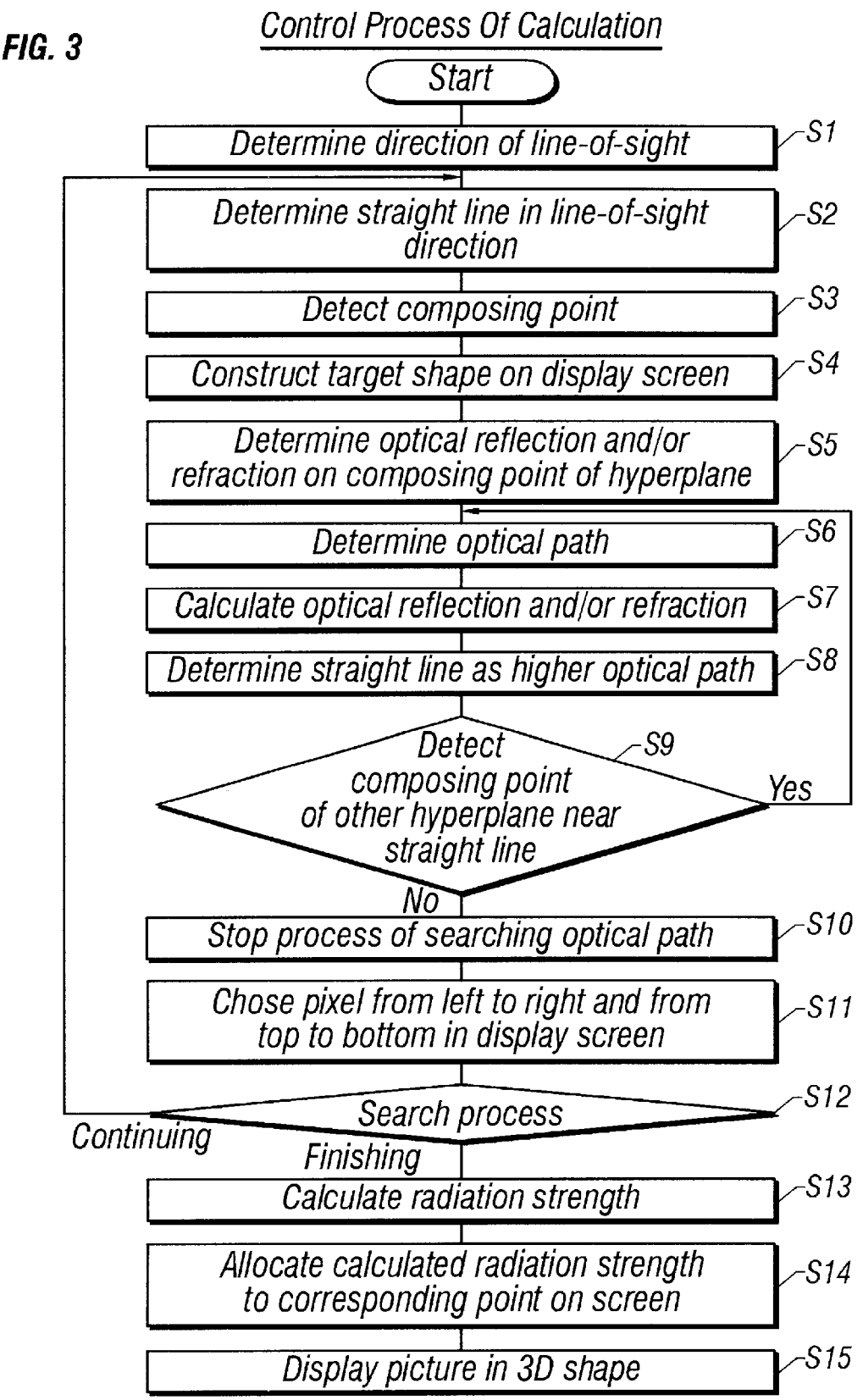

FIG. 4 (1) Pseudo Division
(Division Level 1)
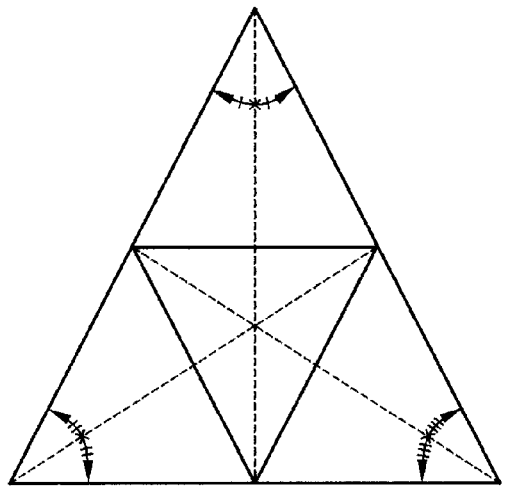
FIG. 4 (2)
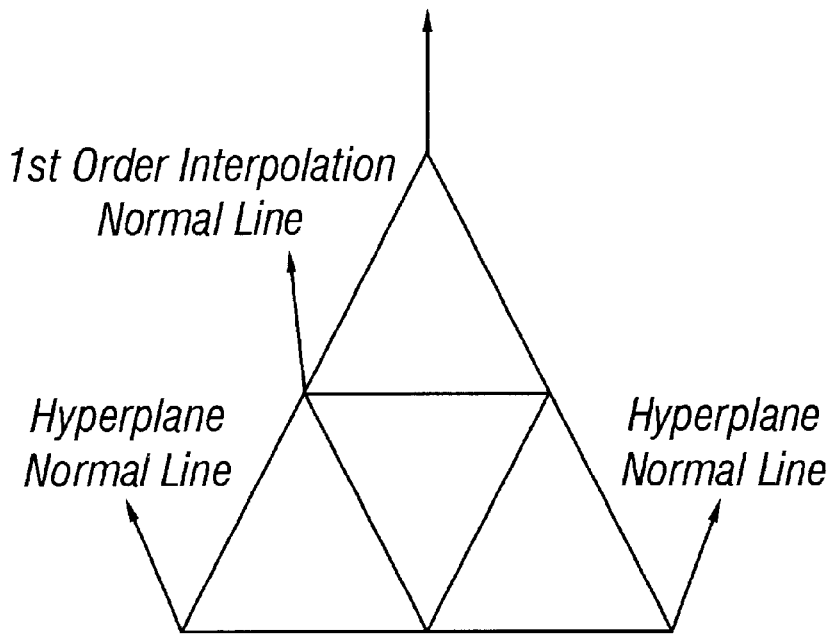

FIG. 5 (1)
Division in Pseudo-Imaging Method
(Pseudo division according to triangular inner center, division level 2)
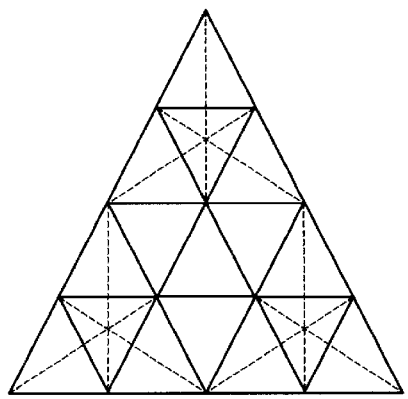
FIG. 5 (2)
Normal Line Interpolation in Pseudo-Imaging Method
(Interpolating level: interpolation with the secondary division)
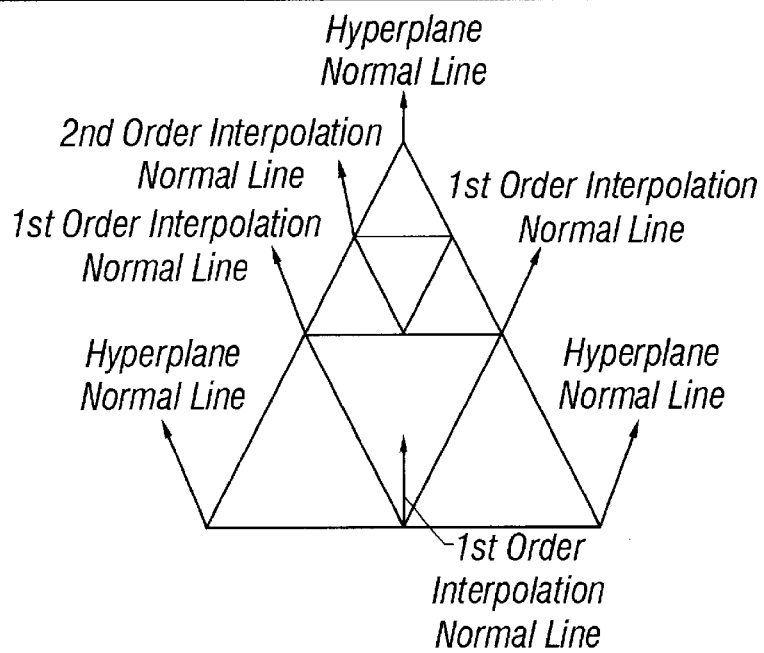

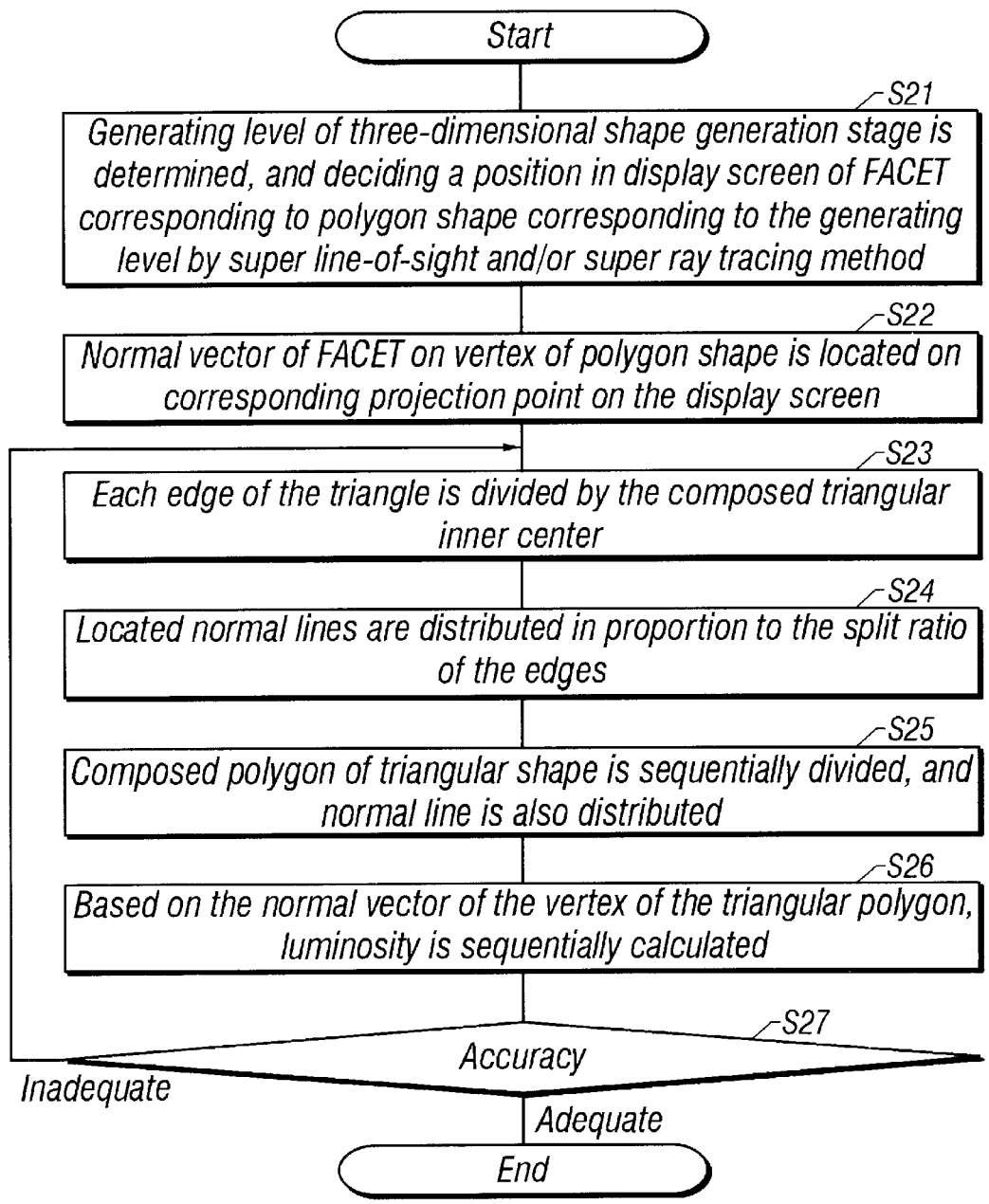
FIG. 6 (1)
Pseudo-Division Imaging Method Based on Normal Line Treating Process

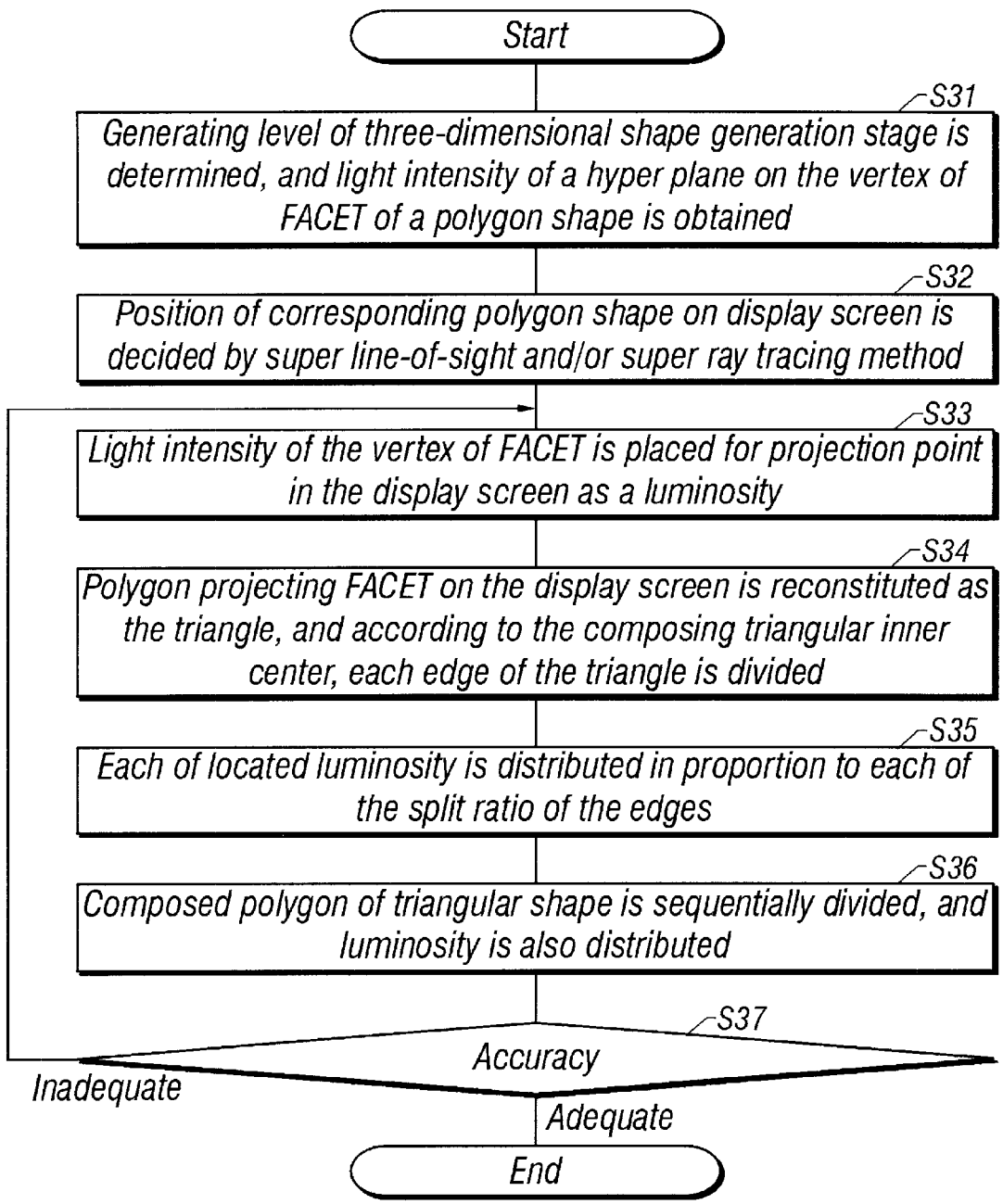
FIG. 6 (2)
Pseudo-Dividing Method Based on Luminosity Treating Process

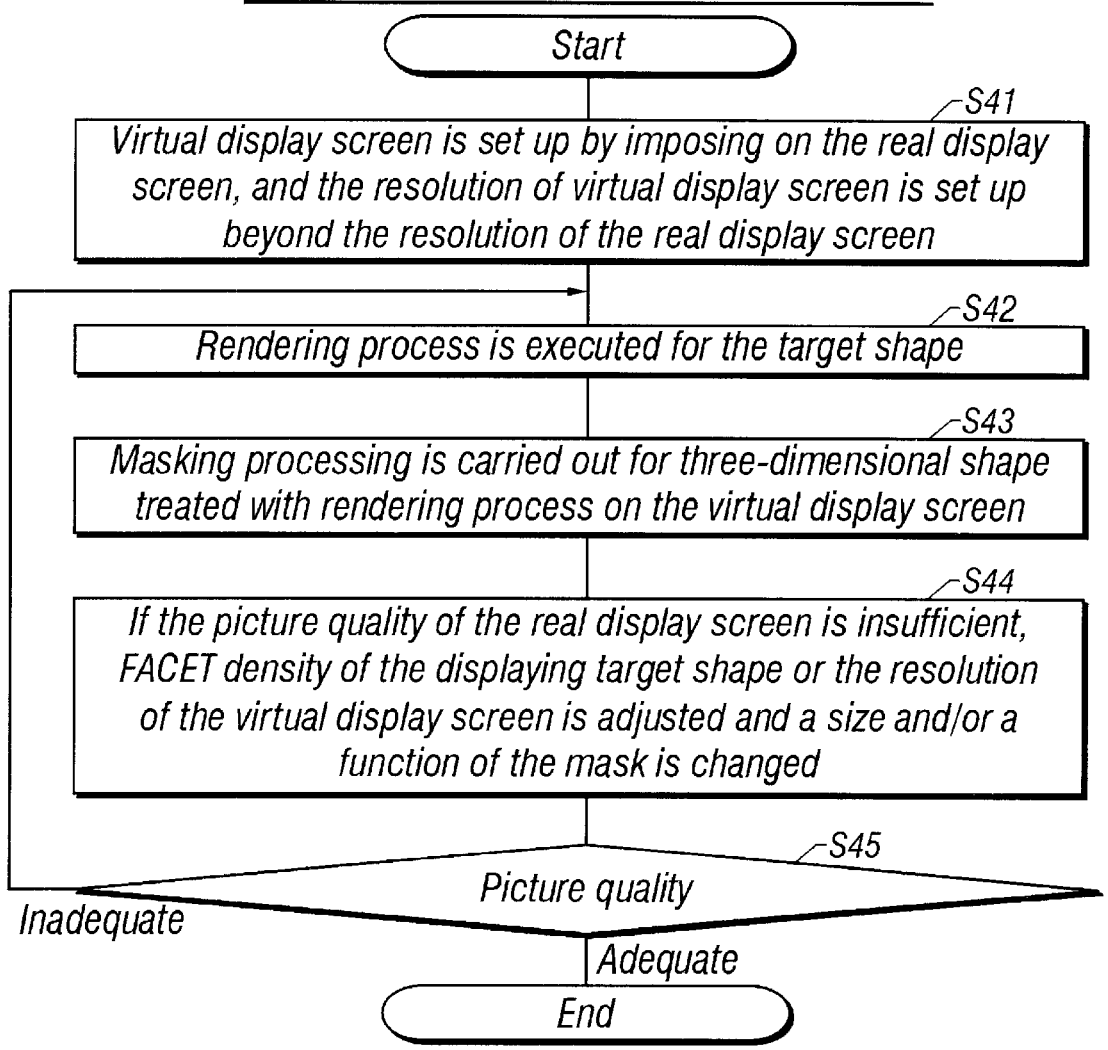

Principle of Ray Tracing Method of Conventional Rendering Technique as One Example

FIG. 10 (1) Prior Art Decision of Normal Line of Vertex as an Average Normal Line

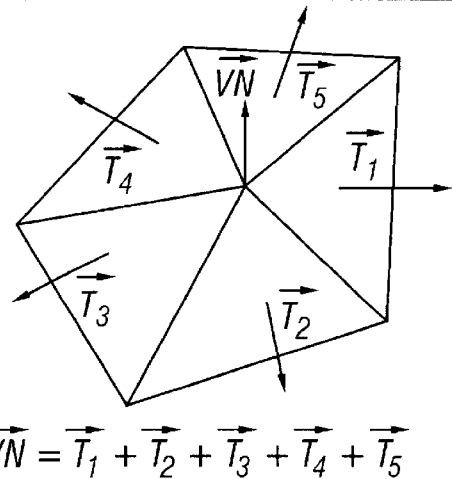

$$\vec{VN} = \vec{T_1} + \vec{T_2} + \vec{T_3} + \vec{T_4} + \vec{T_5}$$

FIG. 10 (2) Prior Art Normal Line Interpolating Method by Scanning

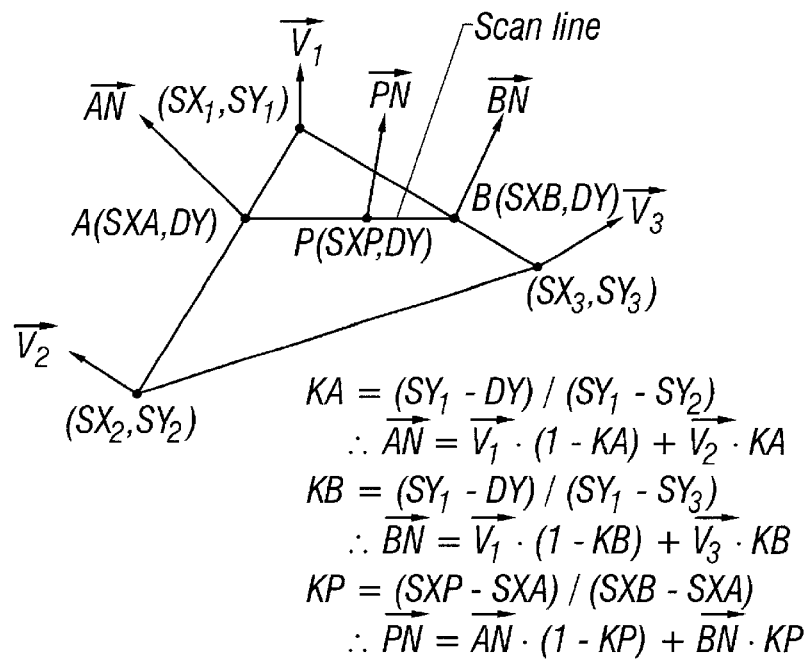

$$KA = (SY_1 - DY) / (SY_1 - SY_2)$$
$$\therefore \vec{AN} = \vec{V_1} \cdot (1 - KA) + \vec{V_2} \cdot KA$$
$$KB = (SY_1 - DY) / (SY_1 - SY_3)$$
$$\therefore \vec{BN} = \vec{V_1} \cdot (1 - KB) + \vec{V_3} \cdot KB$$
$$KP = (SXP - SXA) / (SXB - SXA)$$
$$\therefore \vec{PN} = \vec{AN} \cdot (1 - KP) + \vec{BN} \cdot KP$$

DISPLAY METHOD OF THREE-DIMENSIONAL SHAPE

TECHNICAL FIELD

The present invention concerns the technology which displays the object shape created by the given shape generating system and/or equipment in virtual space, that is the computer world, in order to make a reduction of the target object into real space, that is the physical world, and the technology which realizes what is called virtual reality including the simulation technique.

Of course, the present invention is positioned as the technology which includes the field related to the video image generating technology, for example, as the technology which fulfills the roll to say that the rebuilt image can be made by information projected as the target object in the real world based on information in virtual space through shape input devices.

Namely, the present invention is the interface technology which constructs the cross link between the real world and virtual space, and not only the virtual reality generating technology for the world of the multi-media in a strict sense but also the indispensable one for the general presentation technology, especially the communication with the image in Internet, etc. Incidentally, the present invention is regarded as a basis technology of what is called VRML (Virtual Reality Modeling Language) in the field of the communication technology concerning information of the image. Therefore, a more usable, effective and efficient communication tool can be offered in mechanical communication for the multimedia environment, etc.

Moreover, the present invention provides a more freely constructive means and an efficient tool for bi-direction games, etc. in the complicated execution environment, making it possible to offer a more efficient and comfortable environment for developing and generating video game software. In addition to the field of the former technology, the present invention plays an important role in the technology effectively applicable for not only CAD and/or CAM, but also medical fields as an innovative supporting technology of a diagnostic technique by the visual image.

BACKGROUND ART

FIG. 9 shows the principle of "ray tracing", which is one of the conventional techniques of the rendering method. By this method, the 3D image of target object shapes is displayed on a display screen.

In the ray tracing method, a curved surface body as shown in FIG. 9 can be expressed according to a kind of analytic function, and an intersecting point on the target body can be naturally decided with a straight line (a line-of-sight or a view line) which passes through setting viewpoint E and given function which represents the surface of the target shape.

In this method, the image of the target shape is formed by a cluster of these pixels as a projecting position of the target shape corresponding with surface composing points on the target body with respect to pixels in which intersecting points exist. An intersecting point is determined between the straight line and function represented as the quadric surface when the target shape is regarded as the quadric surface. In this case, the intersecting point decision problem means the solution of the quadratic equation. It is an approximate means of algebraically solving a problem to solve the quadratic equation for determining the intersecting point, and so the target shape can be essentially limited to the quadric surface. Naturally, the higher order (over the 2nd order) curved surface of the target shape cannot be realistically dealt with because of the difficulty in solving equations over the 2nd order related to the prior art, for example, the 3rd order equation. Therefore, in regards to general shapes, the rendering technique is required for an approximate curved surface and the complicated and difficult shape process is also required.

Thus, in the prior art, there are some big problems. For example, one problem is that the extreme limit of applied shape conditions might exist when the ray tracing method is applied. Another is that the calculating efficiency and the picture quality are very low in this method.

In the conventional ray tracing method, it is necessary to decide a normal line (or merely called "normal") at the intersecting point between a line-of-sight and display screen in order to determine the ray locus represented as a straight line, that is propagation of the light, and its luminosity. Except for the special case like a spherical surface, a normal line can be obtained by differentiating the analytic function which expresses the curved surface. In this case in which the intersecting point is obtained, the more difficult problem on a differential operation of function must be caused.

Obviously, the ray can be usually decided based on the reflection and/or the refraction of the light which is calculated with a normal line as a standard method, and a surface point of the target shape existing on the line of the ray defined as the passing locus of the ray can be determined by the same technique of examining the intersecting point in a view line. There is also the same problem when a surface point of the target shape existing in a line of ray is determined.

In the ray tracing method, fundamentally, the determining process must be continued as long as a shape composing point exists in the passing locus of ray. Therefore, in this method, the above calculating and determining process must be also repeated against all pixels on a display screen. Because of the reason related as above, the calculating efficiency become lower and lower if more reality of the target image is needed, and so the dynamic rendering process can be almost impossible.

As another rendering technique, the polygon smoothing method is well known as well as the ray tracing method. As for the ray tracing method, a target shape of virtual space is faithfully formed by tracing along the locus of ray propagation as an image because this ray tracing method accurately constructs the situation of the real world projected by light, while the polygon smoothing method is a concise method considerably simplified with respect to the passing locus which propagates light. In the polygon smoothing method, a 3D shape body can be expressed as a polyhedron, and so this method is applied for only the polygon which is the component of a polyhedron-like shape. That is to say, for example, using the polygon smoothing method, a curved surface can be constructed as a mere aggregate of the minute plane because a curved surface can be expressed as an approximate polyhedron with the closed density of the minute planes.

For the polyhedron with a closed density, it is theoretically possible to apply the ray tracing method. Naturally, it is possible that a formulated equation is established when the intersecting point between a straight line and minute plane which composes the polyhedron should be obtained.

However, a number of the above composing planes of a polyhedron is required in order to raise the higher degree of approximation of the expression as a polyhedron, and a higher density of said composing plane of polyhedron body is necessary. The calculation under the condition as related above is impractical because the amount of the calculation can be enormous when the calculation of the polygon smoothing method is applied in the polyhedron with the higher density of composing planes.

It is naturally concluded that the polygon smoothing method might be applied as the rendering method without considering the degradation of image quality to be formed in order to break through the above problems and as an alternative method for the ray tracing method to be devised in order to clear the limit of the target shape processed by the ray tracing method.

In the meantime, the polygon smoothing method is due to such a method as processing based on the plain-like shape which constructs a surface of a polyhedron and projecting shape which composes the points of the polyhedron on a display screen by means of the clairvoyance and projection method. The shape image with surface composing points of the projected polyhedron is clearly made up as a line-like image. It becomes with the essential that the normal line on a surface composing the point must be obtained in order to convert the line-like image, that is the drawing image, into the plane-like image, that is the painting image. The normal line of the vertex of the polyhedron body is determined as an average of a normal line of the plane which surrounds the vertex because it cannot be compulsorily decided in the case of determining a real normal line of the plane. The method for deciding the normal line of the vertex as an average line is shown in FIG. 10(1).

Though the reflection and/or the refraction of the light can be discussed as the normal line of the vertex determined by the approximation method) the average normal line with respect to the average method can be given instead of the luminosity on a display screen pixel corresponding to the surface composing point of the target shape with the purpose of improving picture quality immediately. Each of the normal lines in proportion to the pixel can be determined as the 1st interpolation using the given average line.

A normal line is determined along the scanning line (the scan-line)of a display screen when the normal line is determined by the 1st interpolation. FIG. 10(2) shows the linear interpolating method on the normal line done by scanning. The luminosity calculation is carried out in the spatial position corresponding to the pixel after the normal line to the pixel is determined. In the case of the polygon smoothing method, the luminosity calculation is carried out as well as doing in the ray tracing method. Though the luminosity is calculated after placing a light source in a space, said ray locus calculation and its integrated evaluation are not executed as a rule.

As a result of this calculation frame, each of the pixel can be given the luminosity calculated as the 0th (zero) order ray propagation related as above, and the plane-like image is formed. As described above, the calculation process is complicated, and so the improvement of calculating efficiency cannot be expected. Therefore, generally, the trade-off operation should be done in the above calculation based on the relationship between calculating efficiency and picture quality. Namely, the number of composing planes of a polyhedron is suppressed in order to improve the calculating efficiency. Picture image quality deteriorates because the target polyhedron is constructed as the rough body and the expression accuracy gets the worse when the number of said planes are suppressed in such a way as related above.

Therefore, in the situation forming the image which exceeds the limit of the trade-off, though the mapping technique which is expected to overcome what the above method lacks is used as a usual way, there is still a problem of frequently hurting the realistic feeling for the shape image, because the picture quality is not improved essentially.

The object of the present invention is to provide the presentation method of the 3D shape with remarkable improvement for both the calculation efficiency and picture quality, in other words, a higher speed and better quality of the picture image, when the 3D shape is displayed.

DISCLOSURE OF THE INVENTION

The present invention relates to a 3D shape presentation method that comprises:

a view point and display screen setting step for setting a view point and a display screen in a space in which a target object exists, according to a pixel position on the display screen that corresponds to the detected shape composing point,;

a direction of view (a line-of-sight) setting step for setting a line-of-sight from the view point;

a composing point of the target shape detecting step for detecting a shape composing point near a line-of-sight, in other words a view line; and a target shape image constructing step for constructing a target shape image on the display screen by way of using a pixel position, which corresponds to the detected shape and is on the display screen, as a projecting point of the target shape.

Furthermore, the present invention also relates to a 3D shape presentation method that comprises:

a light source setting step for setting required light sources in a target object existing space;

an optical wide path pathway) setting step for setting an optical wide path with the detecting region around a line of rays, which has the power of detecting the shape composing point near a line of rays;

a shape composing point detecting step for detecting the composing point existing in the optical path;

a projecting 3D target shape displaying step for displaying a 3D shape on a screen by deciding the radiation strength of the shape composing points and giving the decided radiation strength to the pixel while all of said optical paths are decided by each of the displaying pixels as the controlling point.

BRIEF DESCRIPTION OF THE DRAWINGS

FIG. 1 illustrates the super line-of-sight and/or the super ray tracing method which is one embodiment of the present invention, and the Figure shows the relationship between hyper plane 40 and line-of-sight EL.

FIG. 3 shows the control process of the calculation in the practical example as a flowchart.

FIG. 4 explains the interpolating method with the divided rule as the 1st divided level, which is a result of the pseudo-division imaging method in the practical example.

FIG. 5 explains the interpolating method with the divided rule as the 2nd division level, which is as a result of the pseudo-division imaging method in the practical example.

FIG. 6 shows the interpolating method with the pseudo-division and presentation as a flowchart.

FIG. 7 shows a series of processing flow and the procedure of the virtual display screen as a flowchart, that is one of the practical examples.

FIG. 8 shows the digital filter concerning with the smoothing method.

FIG. 10 shows the method for deciding the normal line of a vertex on a target shape body as an average normal line and the interpolating normal line according to the scanning method.

BEST MODE FOR CARRYING OUT THE INVENTION

Figure 2:
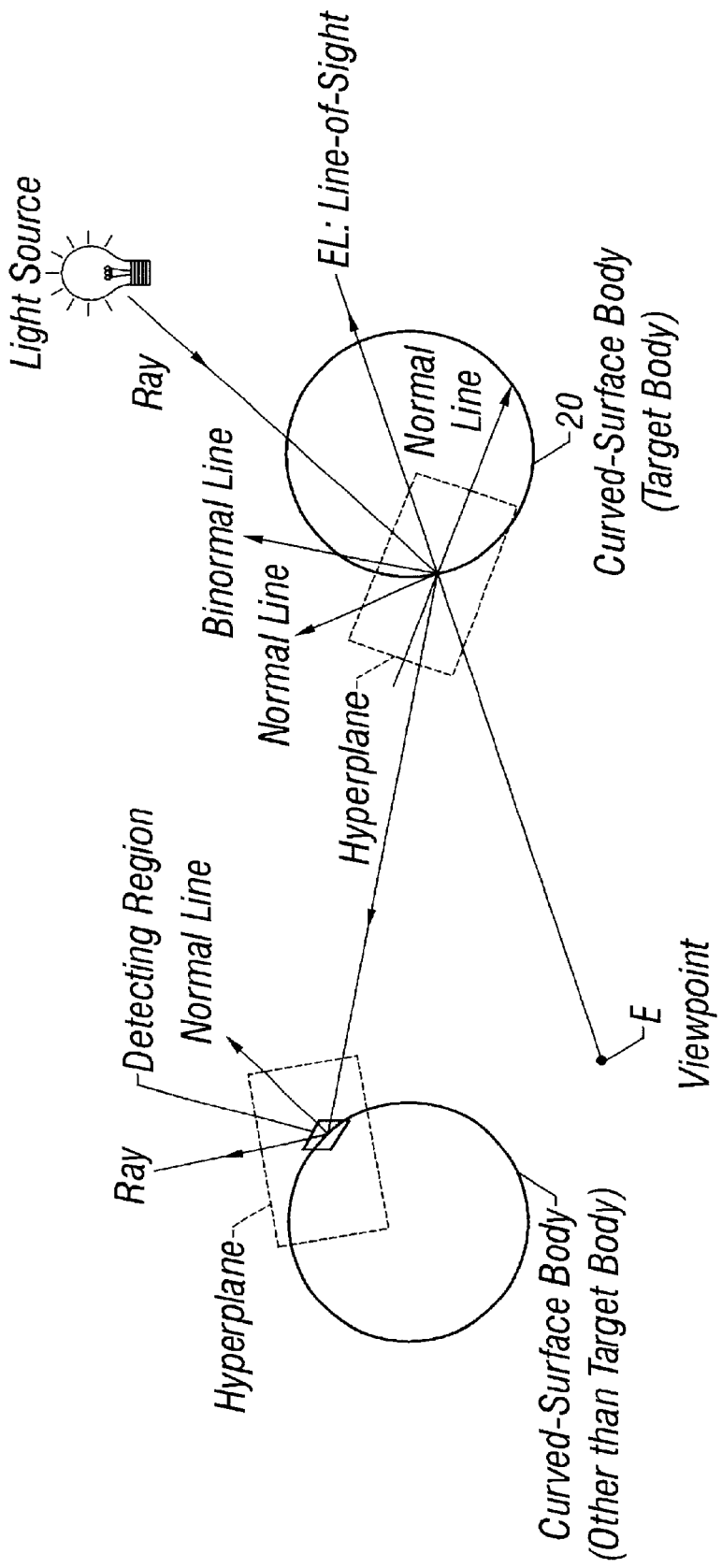
FIG. 2 shows the relationship between an optical path and a hyper plane in another practical example of the present invention.
Figure 9:
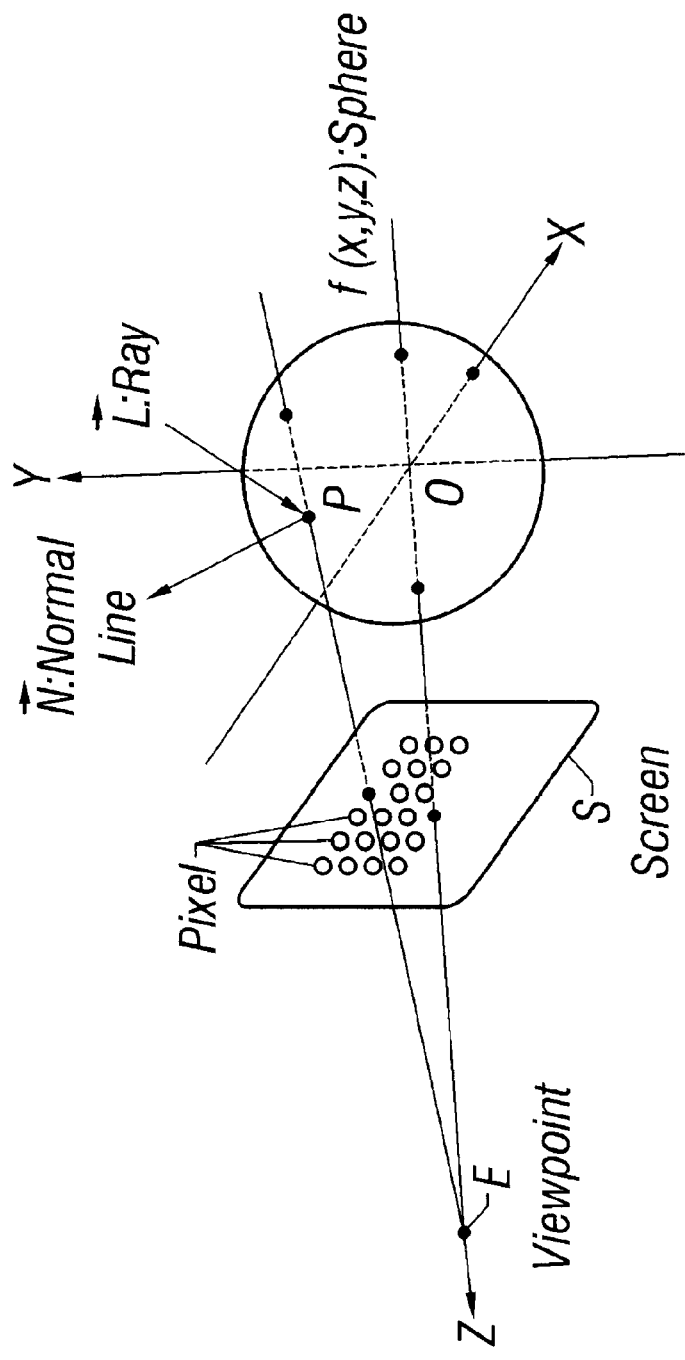
FIG. 9 explains the ray tracing method, that is one of the conventional technology, which generates the image of the 3D target shape as the method of the rendering process in a display screen.

FIG. 1 explains the super line-of-sight and/or the super ray tracing method, so called the novel, unique and innovative rendering technology in which the dynamic rendering process is possible, which is the one of practical examples of the present invention, and shows the relationship between hyperplanes 40 and the line-of-sight EL (which corresponds to claim (1)).

Namely, FIG. 1 shows a typical example of the method for detecting the shape composing point along the line-of-sight EL in schema.

In FIG. 1, at the start, viewpoint E is set up in the spatial position which is able to recognize the target shape. Using the usual visual recognizing coordinate system, the center of display screen 10 is made up to be an origin, and the world coordinate system is constructed mainly as Z axes of the setting coordinate constituted on the straight line which passes through the line-of-sight EL. Though the setting of the world coordinate system is fundamentally optional, this coordinate system is explicit and the simplest as the world coordinate system when processing and/or displaying the target shape in the computer as virtual space is considered.

The coordinate of the viewpoint E is $(0, 0, Ez)$ because the viewpoint E exists on the Z axis based on the setting coordinate system. And, the coordinate position of the pixel necessary for determining the line-of-sight EL is set up to be $(Gx, Gy, Gz)$. In this case, using the relationship of the coordinate system, $Gz=Ez$. According to the reason related as above, when the vector, in other words the line-of-sight, is decided to be $(Ax, Ay, Az)$, the line-of-sight EL can be immediately decided as the following spatial straight line.

Namely, $$X/Ax=Y/Ay=(Z-Ez)/Az=t \qquad (1)$$

wherein $$Ax=Gx/L \qquad (1.1)$$

$$Ay=Gy/L \qquad (1.2)$$

$$Az=Ez/L \qquad (1.3)$$

and therefore, the noticing distance L from the viewpoint E to the pixel in a display screen is $$L=(Gx^2+Gy^2+Ez^2)^{1/2} \qquad (1.4)$$

The method of detecting the shape composing point existing in the wide visual path, visual pathway, around the line-of-sight EL will be described next.

For detecting the shape composing point under the condition that the projecting relationship between the pixel and the shape composing point is satisfied, detecting region 30 is made up as the visual pathway around the line-of-sight EL because the shape composing point is projected at the screen pixel constructing the picture image. The "projecting relationship" is to be set up as the virtual route along the line-of-sight EL, in other words a visual pathway, and the virtual route such as a visual pathway is a tubular route having a thickness. A detecting region 30 is a cross section in the imaginary and tubular route.

As a coordinate system for setting the detecting region 30, the relative coordinate system is set up by relating to the world coordinate system, that is the absolute coordinate system. This relative coordinate system is set up by making the cross point between the line-of-sight and plane including the shape composing point parallel to the X-Y plane to be the origin, and then by doing the parallel moving operation for the X-Y-Z coordinate system. This detecting region 30 is mainly determined as the region in response to the shape image of pixels on a display screen, and the center of the region is positioned on the origin in the x-y coordinate system. For example, in FIG. 1, the circular shape is shown as a shape of pixels for said detecting region, and moreover the squared shape which is the circumscribed shape of said circle might be set up as a shape of the target display pixel. It is desirable that the rectangular shape (square) be set up as shape of pixels, because the required shape composing point which should be projected in a display screen 10 may leak out from said detecting region 30 when said circular shape is set up as the shape of detecting region 30.

In the above embodiment, the detecting region is made up to be circumscribed rectangle of the circular shape on the displaying pixels, and the length of the edge of the rectangular shape is respectively made to be 2dx and 2dy. If the coordinate of the shape composing point related as the detecting object is made to be $(Px, Py, Pz)$, whether or not the shape composing point exists in the setting region can be examined by the following discriminant.

Considering the detecting and evaluating procedure, first of all, it is necessary to deduce the required determining parameter t from the equation (2.1). As the detecting operation is performed for the shape composing point, the detecting relation is built up as $$t=(Pz-Ez)/Az \qquad (2.1)$$

Since the shape composing point exists on the position of coordinate $(Px, Py)$, it is possible to decide the coordinate of the shape composing point in the x-y relative coordinate system immediately. Namely, $$dX=Px-Ax*t \qquad (2.2)$$

$$dY=Py-Ay*t \qquad (2.3)$$

wherein coordinate $(dX, dY)$ is a position in the shape composing point in the relative coordinate.

Accordingly, when evaluating and determining whether or not the shape composing point exists in the set detecting region 30, it can be concluded that the shape composing point exists in the set detecting region 30 if the equations (2.4) and (2.5) below are satisfied simultaneously.

$$-dx \leq dX \leq dx \qquad (2.4)$$

$$-dy \leq dY \leq dy \qquad (2.5)$$

It is possible to choose the pixel as an image position because it can be decided by the evaluating criterion according to the determination whether the shape composing point exists in the setting region. As a result, the binary (gray scale) image of the 3D shape is formed on a display screen 10.

FIG. 2 shows the relationship between the optical path and hyper plane in a typical embodiment of the present invention (which corresponds to claim (2)).

More specifically, FIG. 2 shows one of the specific examples of the method for deciding a whole optical path, that is to say, the shape composing point on the optical path is detected by means of the sequential search.

In FIG. 2, when the shape composing point is detected, the shape composing point is determined in the same way as the method in FIG. 1. In this method, it is sufficient only by replacing the visual pathway used by the method in FIG. 1 with the optical pathway. The foundation of the calculating mechanism is made up completely under the condition which accurately simulates the physical behavior of light on the shape composing point by replacing the visual pathway in FIG. 1 with the optical pathway. For example, it is possible that calculation of light intensity on the shape composing point can be dealing with a pixel as luminosity because the real color image equal to observing color in the real world is created as light intensity on the shape composing point. In this calculating mechanism, the calculating process is sufficient for only executing coordinate transformation as relative coordinates in order to correspond to the shape composing point. However, it is necessary to carry out the control sequentially executed in the calculating process.

FIG. 3 shows the controlling process of the practical calculating example in the flowchart (which corresponds to claim (3)).

The viewpoint E and display screen 10 are set up, as the 1st step (S1). The target pixel under the control is chosen and said direction of line-of-sight EL is determined, as the 2nd step (S2). The direction of the straight line, namely the line-of-sight EL, is determined and the visual pathway is set up, as the 3rd step (S3). Then, the shape composing point of the hyperplane which exists in the visual pathway is detected, as the 4th step (S4). The target shape is constructed with respect to the position, namely the projection position of the hyperplane of the object shape, on a display screen 10, which exists in the direction of the detected line-of-sight EL, as the 5th step (S5). FIG. 1 shows the required condition that the target shape is to be constructed. As for the hyperplane, it is the interface which makes two parts of the space, and it divides the target space into both the inside world and the outside world. The hyperplane on 3D space is formed as the plane with a normal line, in other words the tangent plane, at the shape composing point. Therefore, generally speaking, the hyperplane of 3D space is constructed by a set between a shape composing point and its normal line on the hyper plane.

Moreover, the reflection and/or the refraction of the light is calculated based on the direction of the hyperplane constructed by the shape composing point, that is the normal line, as the 6th step (S6); the direction of the optical pathway is determined based on the reflection and/or the refraction of the calculated light, as the 7th step (S7); the optical pathway (ray flux) is determined in search of the ray direction, as the 8th step (S8); and then it is determined whether other shape composing points are detected or not on the determined optical pathway, in other words, whether the object except for the target object exists, as the 9th step (S9). On searching the optical pathway, the procedure in search of the optical pathway is stopped unless a shape composing point of other hyperplane can be detected, as the 10th step (S10); and the pixel to be controlled is chosen scanning from the top to the bottom and from the left of display screen 10 to the right, as the 11th step (S11).

For the optical pathway over the 1st order optical pathway, that is to say for the secondary path and so on, the optical pathway is determined by repeating the processing procedure of the steps S6 to S9, when the shape composing point of other hyperplanes exist in the optical pathway (S9); and the procedure of the optical pathway calculation is carried out and the calculation is compulsorily stopped considering picture quality and calculating amount. In addition, the calculating process is stopped in response to the attenuation condition of the light there when the light intensity in each optical pathway is calculated.

Furthermore, under the condition that the pixel which constitutes display screen 10 is chosen for the displaying control from the top to the bottom and from the left to the right of display screen 10 as (S11) until the search process finishes, the processing procedure of the steps from S2 to S11 is repeated, as the 12th step (S12). Based on the result of the optical pathway search, the radiation strength of the light is determined, as the 13th step (SI 3). The radiation strength, in other words all input light, is given to the pixel position of the target shape, namely controlling point, determined on the hyperplane on a display screen 10 in the step S5, as the 14th step (S14). Finally, all shapes are displayed in search of the ray pathway, as the 15th step (S15). Accordingly, the calculating process is finished.

A simple visualizing method on the 3D shape in the present invention is explained next.

The controlling process of the present invention is simplified by applying the clairvoyance projection method instead of the processing procedure of the steps from S1 to S5 on the flowchart in FIG. 3.

In the visualizing method of the 3D shape, a little correction should be done against the branch of the control structure on the flowchart in FIG. 3, and the method is constructed based upon the process content after step S6. Therefore, the simple visualizing method of the 3D shape is systematically combined and realized in the clairvoyance projection method which is a customary method instead of the steps from S1 to S4 on the flowchart in FIG. 3. In the combined means of the simple visualizing method, the processing content of the 0th(zero) order optical pathway fundamentally agrees with the processing content of the polygon smoothing method. Moreover, in the simple visualizing method of the 3D shape, it is reasonable and can be easily realized with respect of the process of the higher order optical (ray) pathway, which almost cannot be realized in the polygon smoothing method.

However, the simple visualizing method of the 3D shape is the pseudo-shape display process, because the display processing method of the 3D shape carries out on a display screen 10 as well as the polygon smoothing method. Therefore, the simple visualizing method of the 3D shape can show the supreme work different from the prior art technology by relating to the pseudo-division imaging method which will be described below. As a result, it is possible to overcome the problem of the former technology in spite of being the simplified presenting method.

Next, the pseudo-division imaging method (which corresponds to claim (4)) will be described.

The pseudo-division imaging method works as the technology which is complementary for the 3D shape displaying method. As a straightforward expression, the simplified method for visualizing the 3D shape make it possible to easily and efficiently improve picture quality even when the pixel density related to the image generated by the method is quite sparse and the target shape cannot be sufficiently expressed.

In this pseudo-division imaging method, it becomes the processing situation on a display screen 10 because of the pseudo-division, and the interpolating method accompanied with the division for searching the normal line, which is found in the same process of the polygon smoothing method, is required.

FIGS. 4 (1) and (2) explain the interpolating method of the pseudo-division representing method for the dividing level 1 in a practical example.

In this interpolating method of the pseudo-division imaging method, it is dependent on characteristics of the curved surface shape formed by the given shape generating equipment, and then the patch of the formed triangle is divided while the shape is retained as shown in FIG. 4 (1). For example, the interpolation of the pseudo-division imaging method is executed by dividing the edge of the patch based on the triangular inner center. That is to say, the original triangle will be divided as follows: a new triangle is formed according to each of intersecting points made by each line, which are connected with respect to each vertex and the inner center of the original triangle, and each edge of the original triangle. And so there is one triangle remaining in the original triangle when three triangles are picked out from the original triangle. Namely, four new triangles are constructed as total sum.

If the division is executed, one triangular shape is reconstructed as four triangular patches which are deduced from a patch of the target object. After the above dividing process, the normal line gained by the 1st order interpolation from the normal line equivalent to the normal line of the hyperplane, which is given at each vertex of the patch of the divided object, is distributed on each vertex of the newly composed four triangles. When the normal line is allocated as the above manner, though this process is regarded as a pseudo process, a so-called FACET with the facility required for the hyperplane would be formed as shown in FIG. 4 (2).

In the step after the interpolating method of the pseudo-division imaging method is executed, the pseudo-FACET of the formed triangular shape is divided again. For the dividing point of the reformed FACET, the rebuilt normal line is allocated again after the normal line is determined by the 1 st order interpolation as well as the dividing process shown in FIG. 4 (1). The above processing situation which is carried out in this method is shown as FIGS. 5 (1) and (2). And then, for the pseudo-divided FACET, the dividing stage is sequentially repeated until the level necessary for obtaining desirable picture quality is reached.

FIG. 6 shows the interpolating method of the pseudo-division imaging method according to a flowchart. As shown in FIG. 6 (1), the flowchart explains the pseudo-dividing process based on the normal line. Namely, the level of the generating stage of said 3D shape is determined, and then the position of the FACET corresponding to the polygon-like shape on a display screen 10 is decided in response to the generating level by the super line-of-sight and/or the super ray tracing method, as the 21st step (S21). The normal line of the FACET, in other words the normal line of each vertex of the polygon, is placed at the point projected on a display screen 10, as the 22nd step (S22). Each edge of the composed triangle is divided again according to the inner center of the triangle in order to reconstruct the polygon constituted by projecting the FACET on a display screen 10 in terms of the triangular shape, as the 23rd step (S23).

The located normal line is distributed on each divided point in proportion to such division ratio as dividing the edge of the triangle, as the 24th step (S24). The polygon of the composed triangle is divided one after another and the interpolated normal line is distributed sequentially, as the 24th step (S25). After processing the location of the normal line, the luminosity is calculated one after another or in a batch process, as the 26th step (S26). If the above process has not reached at a sufficient modeling accuracy and necessary picture quality, the pseudo-dividing process based on the normal line of the polygon of the triangle is repeated by means of dividing the polygon sequentially until sufficient modeling accuracy and necessary picture quality are reached, as the 27th step (S27).

In FIG. 6 (2), the flowchart related to the pseudo-division imaging method based on the luminosity process is shown. As for the flowchart, the level of generating stage of the 3D shape is determined, and then the luminosity on the point of the FACET corresponding to the polygon-like shape on a display screen 10 is decided in proportion to the generating level, as the 31st step (S31). The position of the polygon-like shape on a display screen 10 corresponding to the distributed position of the luminosity is decided by the super line-of-sight and/or the super ray tracing method, as the 32nd step (S32). The luminosity is distributed on the projected point on a display screen 10 by regarding the light intensity of each vertex of the FACET as its luminosity, as the 33rd step (S33). The composed polygon by means of projecting the FACET on a display screen 10 is made up as the same triangular shape and each edge of the recomposed triangular polygon is divided based on the inner center of the triangle, as the 34th step (S34).

The located luminosity is distributed according to the division ratio of dividing the edge based on the original luminosity, as the 35th step (S35). The composed polygon with the triangular shape is divided one after another and the determined luminosity is sequentially distributed, as the 36th step (S36). If the pseudo-dividing process has not reached sufficient modeling accuracy and necessary picture quality, the polygon of the triangular shape is divided again, and then the pseudo-dividing process is continued until sufficient modeling accuracy and necessary picture quality are reached, as the 37th step (S37).

Easy and free improvement of picture quality can be done because the image construction can be improved by the pseudo-operation on the sequential division and iterative interpolation.

Therefore, for example, in the image displaying operation, the easy realization of the dynamic image process can be done because of shortening the processing time without the degradation of picture quality. Moreover, following the practical example, the pseudodivision imaging method is very effective in the technology of supporting the image transfer as the process of compression and restoration of image data, etc. For this reason, the easy and efficient realization of the mechanical communication in the multimedia environment can be done.

The virtual display screen visualizing method (which corresponds to claim (5)) will be next described.

Incidentally, though the virtual display screen visualizing method is not fundamentally required in the shape generating system and/or equipment by which the target shape can be formed as the optimum shape modeling, it becomes a necessary technology when the extended picture grade of the image is required.

For example, the display screen density of the virtual display screen becomes 10 times the real display screen if the resolution of the virtual display screen is set up as 1/10 with respect to the real display screen. Under the condition for setting up the virtual display screen related as above, the rendering process is carried out on the shape which is created by the shape generating system and/or equipment. For example, the rendering process is carried out based on the super line-of-sight and/or the super ray tracing method.

In this case, the rendering process is performed by superimposing the high-density virtual display screen on the real display screen. The masking process is carried out as the next processing step on the image which is created on the virtual display screen. Here, the image displaying process is carried out, where the applied image is determined as the real image in proportion to the pixel followed by the transfer of the mask using the high density of the virtual display screen So as to easily carry out an adjusting pace of the mask, the masking size is chosen at 5×5 as shown in FIG. 8. Generally speaking, a masking size in proportion to an adjusting pace for masking can be taken as a standard, because it might be determined by considering the density of shape formation on the virtual display screen and the presentation effect of the displaying process. As a result, the masking center is located at the pixel in the real display screen. The merit to use this kind of mask is that the filter with consistency which complies with the display processing object can be selected since not only the "deziering method" which is used for data smoothing as a smoothing method in the world of CG (computer graphics), in other words for data smoothing with random number, but also a general purpose filter can be applied.

In this case as well as described above, the digital filter of the smoothing method as shown in FIG. 8 is employed as the mask. As the masking procedure, the spatial strain with the processing image can be removed and the spatial heterogeneity of the displaying image can be decreased. The display screen of natural picture quality is thus obtained. When the necessary effect of the processing image is not obtained by a series of the above process, even the process for such an adjustment as raising the FACET density is required in proportion to the generating level of the FACET related to the target shape gained by using the shape generating system and/or equipment. And moreover, the change of the mask size, the change of its function and the change of the pixel density of the virtual display screen are executed simultaneously or sequentially as the recursive method until the goal of picture quality is reached.

FIG. 7 is a flowchart that shows a series of the processing flow in the virtual display screen visualization and its procedure as one of the practical examples.

More specifically, the virtual display screen is set up as it is superimposed on the real display screen, and the resolution of the virtual display screen is set up at the size which exceeds the resolution of the real display screen, as the 41st step (S41). The rendering processes are executed for the target shape, as the 42nd step (S42). As the resolution power of the real display screen should coincide with the displaying pixel density of the vidual-display screen when the 3D shape is processed on the virtual display screen by means of the rendering process, the masking process is executed, as the 43rd step (S43).

The FACET density of the displaying target shape and the resolution of the virtual display screen are also adjusted or the size and the function of the mask are changed when the picture quality of the real display screen is insufficient, as the 44th step (S44). The processing steps of S42 and S43 and (S44) are repeated, and these processes are stopped when a sufficient picture quality corresponding to the demanded picture quality is obtained, as the 45th step (S45).

As a result, the easy realization of the synthesis image process is done keeping the integrated image which is made up by embedding the composed image in, for example, the video image on a display screen. Naturally, a kind of synthesis image can look like a natural image, and so it is significantly contributed as an excellent image having visual picture quality with the comfortable feeling in the construction of the world in multi-media.

The program for displaying the 3D shape, which is realizing each of practical examples, is recorded on a recording medium such as ROM, magnetic disk, optical disk, floppy disk, CD-ROM, DVD, hard disk, and the like.

What is claimed is:

1. A presentation method of a three dimensional (3D) shape comprising;

a view point and a display screen setting step for setting a view point and a display screen in space;

a line-of-sight setting step for setting a line-of-sight, that is a view line, which passes through between said view point and a pixel on said display screen;

a visual pathway setting step for setting a visual pathway, that is a wide visual path equivalent to a wide view locus, which has a region detecting a composing point of a target shape around said view line;

a composing point of the target shape detecting step for detecting a shape composing point in said visual pathway; and a target shape image constructing step for constructing a target shape image on said display screen by way of using a pixel position, which corresponds to the detected shape and is on the display screen, as a projecting point of the target shape.

2. A presentation method of a three dimensional (3D) shape comprising;

a light source setting step for setting a light source in space;

an optical pathway setting step for setting an optical pathway, that is a wide optical path equivalent to a wide ray locus, which has a region detecting a composing point of the target shape around a line of rays (ray locus);

a shape composing point detecting step for detecting a shape composing point in said optical pathway; and a projecting 3D target shape displaying step for displaying a 3D shape on a screen by deciding the radiation strength of the shape composing points and giving the decided radiation strength to the pixel while all of said optical paths are decided by each of the displaying pixels and/or scanning lines as a control point and/or a control line.

3. A presentation method of a three dimensional (3D) shape according to claim 2, wherein said optical pathway setting step comprises:

another shape composing point in a 1st (order) optical pathway detecting step for detecting another shape composing point in said optical pathway which is defined as said 1st optical pathway;

a search stopping step for compulsorily stopping the search of said 1st optical pathway, when the composing point of another target shape does not exist or cannot be detected in the 1st optical pathway which is defined as the 0th (order) optical pathway;

a shape composing point in a 2nd (order) optical pathway detecting step for detecting another shape composing point in the 2nd optical pathway which is made up on said shape composing point detected in the 1st optical pathway;

a higher (order) optical pathway setting step for setting a higher optical pathway by repeating sequentially in the same way as said optical pathway setting step; and a shape composing point search process in the higher optical pathway stopping step for stopping said shape composing point search process in the higher optical pathway, based on either a compulsory stop of the higher optical pathway search process or a physical standard that includes the strength attenuation of ray.

4. A presentation method of a three dimensional (3D) shape comprising;

a virtual display screen imposed on the real display screen setting step for setting a virtual display screen imposed on a real display screen with respect to the resolution of the virtual display screen which exceeds the resolution of the real display screen;

a rendering process executing step for executing the rendering process for the target shape;

a masking process executing step for executing a masking process which is making the pixel density of said virtual display screen coincide with said resolution of said real display screen in order to display the 3D rendering shape on said virtual display screen; and a rendering process and masking process repeating step for repeating said rendering process and said masking process until desirable picture quality is obtained by adjusting a FACET density of the displaying target shape or the resolution of said virtual display screen, and moreover changing a size and/or a function, if picture quality of said real display screen is insufficient.

5. A medium recorded with a program for functionally working a computer for displaying a three dimensional (3D) shape comprising:

a view point and display screen setting means for setting a view point and display screen in a space;

a line-of-sight setting means for setting a line-of-sight, that is view line, which passes between said view point and a pixel on said display screen;

a visual pathway setting means for setting a visual pathway, that is a visual pathway including a view line with the fixed detecting region in the circumference of said view line;

a composing point of the target shape detecting means for detecting a shape composing point in a visual pathway; and an image of the target shape on a display screen constructing means for constructing an image of the target shape on said display screen as projecting points of the target shape.

6. A medium recorded with a program for functionally working a computer for displaying a three dimensional (3D) shape comprising;

a light source setting means for setting a light source in space;

an optical pathway setting means for setting an optical pathway, that is a wide optical path equivalent to a wide ray locus, which has a region detecting a composing point of the target shape around a line of rays (ray locus);

a shape composing point detecting means for detecting a shape composing point in said optical pathway; and a target 3D shape forming and displaying means for constructing all of said optical pathway as a control point and/or a control line corresponding with a pixel and/or a scanning line on a display screen and displaying the constructed 3D shape by giving a decided radiation strength to pixels on a display screen after deciding the radiation strength of the shape composing point according to said optical pathway.

7. A medium recorded with a program for functionally working a computer for displaying a three dimensional (3D) shape comprising:

a virtual display screen imposed on a real display screen setting means for setting a virtual display screen imposed on a real display screen with respect to the resolution of the virtual display screen which exceeds the resolution of the real display screen;

a rendering process executing means for executing the rendering process for the target shape;

a masking process executing means for executing a masking process coinciding with the pixel density of said virtual display screen with said resolution of said real display screen in order to display the 3D rendering shape on said virtual display screen; and a rendering process and a masking process repeating means for repeating said rendering process and said masking process until a desirable picture quality is obtained by adjusting a FACET density of the displaying target shape or the resolution of said virtual display screen if the picture quality of said real display screen is insufficient, or changing a size and/or function of the mask.

* * * * *

UNITED STATES PATENT AND TRADEMARK OFFICE
CERTIFICATE OF CORRECTION

PATENT NO.    : 6,400,365 B1
DATED         : June 4, 2002
INVENTOR(S)   : Ryozo Setoguchi It is certified that error appears in the above-identified patent and that said Letters Patent is hereby corrected as shown below:

Title page,
Item [76], Inventor, change "Ryozo Setoguchi, 27-3, Naritahgashi 3-chome, Suginami-ku, Tokyo (JP)" to -- Ryozo Setoguchi, 27-3, Naritahigashi 3-chome, Suginami-ku, Tokyo (JP) --

Signed and Sealed this

Tenth Day of August, 2004

JON W. DUDAS
*Acting Director of the United States Patent and Trademark Office*